United States Patent
Gao et al.

(10) Patent No.: US 9,842,077 B2
(45) Date of Patent: Dec. 12, 2017

(54) CONTROL SERVER SYSTEM WITH A SWITCH AND COMPARING CIRCUIT FOR CONTROLLING A TRIGGER TIME FOR BUFFER AND POWER SIGNAL BASED ON CURRENT STATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yang Gao, Shenzhen (CN); Kang Wu, Shenzhen (CN)

(73) Assignees: HONG FU JIN PRECISION INDUSTRY (SheZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 265 days.

(21) Appl. No.: 14/808,857

(22) Filed: Jul. 24, 2015

(65) Prior Publication Data
US 2016/0364355 A1 Dec. 15, 2016

(30) Foreign Application Priority Data
Jun. 9, 2015 (CN) .......................... 2015 1 0311018

(51) Int. Cl.
 G06F 13/40 (2006.01)
 G06F 1/26 (2006.01)
(52) U.S. Cl.
 CPC .......... G06F 13/4022 (2013.01); G06F 1/266 (2013.01); G06F 13/4027 (2013.01)
(58) Field of Classification Search
 CPC .................................................. G06F 13/4022
 See application file for complete search history.

(56) References Cited

U.S. PATENT DOCUMENTS

| 2005/0081074 A1* | 4/2005 | Chheda | G06F 1/3203 713/320 |
| 2006/0020740 A1* | 1/2006 | Bartley | G06F 11/2007 711/100 |
| 2013/0166929 A1* | 6/2013 | Tian | G11C 5/147 713/300 |
| 2013/0181748 A1* | 7/2013 | Zajc | H03K 19/017 327/109 |

\* cited by examiner

*Primary Examiner* — Tammara Peyton
(74) *Attorney, Agent, or Firm* — ScienBiziP, P.C.

(57) ABSTRACT

A control system includes a switch circuit, a buffering circuit, and a motherboard. The switch circuit is configured to output a switch signal having a trigger time. The buffering circuit determines whether the trigger time of the switch signal is equal to a predetermined time. If the trigger time of the switch signal is equal to the predetermined time, the buffering circuit outputs a signal to the motherboard. The motherboard performs a power off operation.

12 Claims, 2 Drawing Sheets

CONTROL SERVER SYSTEM WITH A SWITCH AND COMPARING CIRCUIT FOR CONTROLLING A TRIGGER TIME FOR BUFFER AND POWER SIGNAL BASED ON CURRENT STATUS

FIELD

The subject matter herein generally relates to a server control system.

BACKGROUND

A server includes a button to power off the server. For example, when the server is in a stand-by state, the server is powered on as the button being pushed. When the same button is pressed again as the server is in an operation state, the server is powered off.

BRIEF DESCRIPTION OF THE DRAWINGS

Implementations of the present technology will now be described, by way of example only, with reference to the attached figures.

DETAILED DESCRIPTION

Figure 1:
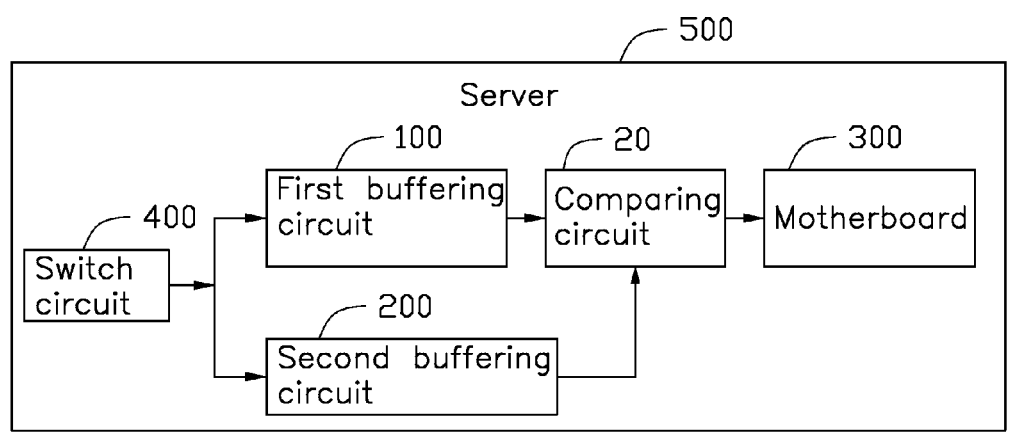
FIG. 1 is a block diagram of an embodiment of a control system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The present disclosure is described in relation to a motherboard having different types of inter integrated circuit (I2C) interfaces.

FIG. 1 illustrates an embodiment of a control system of the present disclosure. The control system is configured to power on/off a server 500. The control system can comprise a switch circuit 400, a first buffering circuit 100 electrically coupled to the switch circuit 400, a second buffering circuit 200 electrically coupled to the switch circuit 400, a comparing circuit 20 electrically coupled to the first and second buffering circuits 100 and 200, and a motherboard 300 electrically coupled to the comparing circuit 20. The motherboard 300 receives power from the comparing circuit 20.

In at least one embodiment, the switch circuit 400 can output a switch signal to the first and second buffering circuits 100 and 200. The first buffering circuit 100 can generate a first buffering signal after receiving the switch signal. The second buffering circuit 200 can determine whether a trigger time of the switch signal is equal to a predetermined time. The second buffering circuit 200 can output a first status of a second buffering signal when the trigger time of the switch signal is equal to the predetermined time, and the second buffering circuit 200 can output a second status of the second buffering signal when the trigger time of the switch signal is less than the predetermined time. The comparing circuit 20 can receive the first and second buffering signals, and generate a non-power signal.

In at least one embodiment, the motherboard 300 can perform the power off operation according to the voltage level of the power signal from the comparing circuit 20. For example, when the voltage level of the power signal is at a low voltage level, the motherboard 300 will perform the power off operation, thereby switching the server 500 off.

Figure 2:
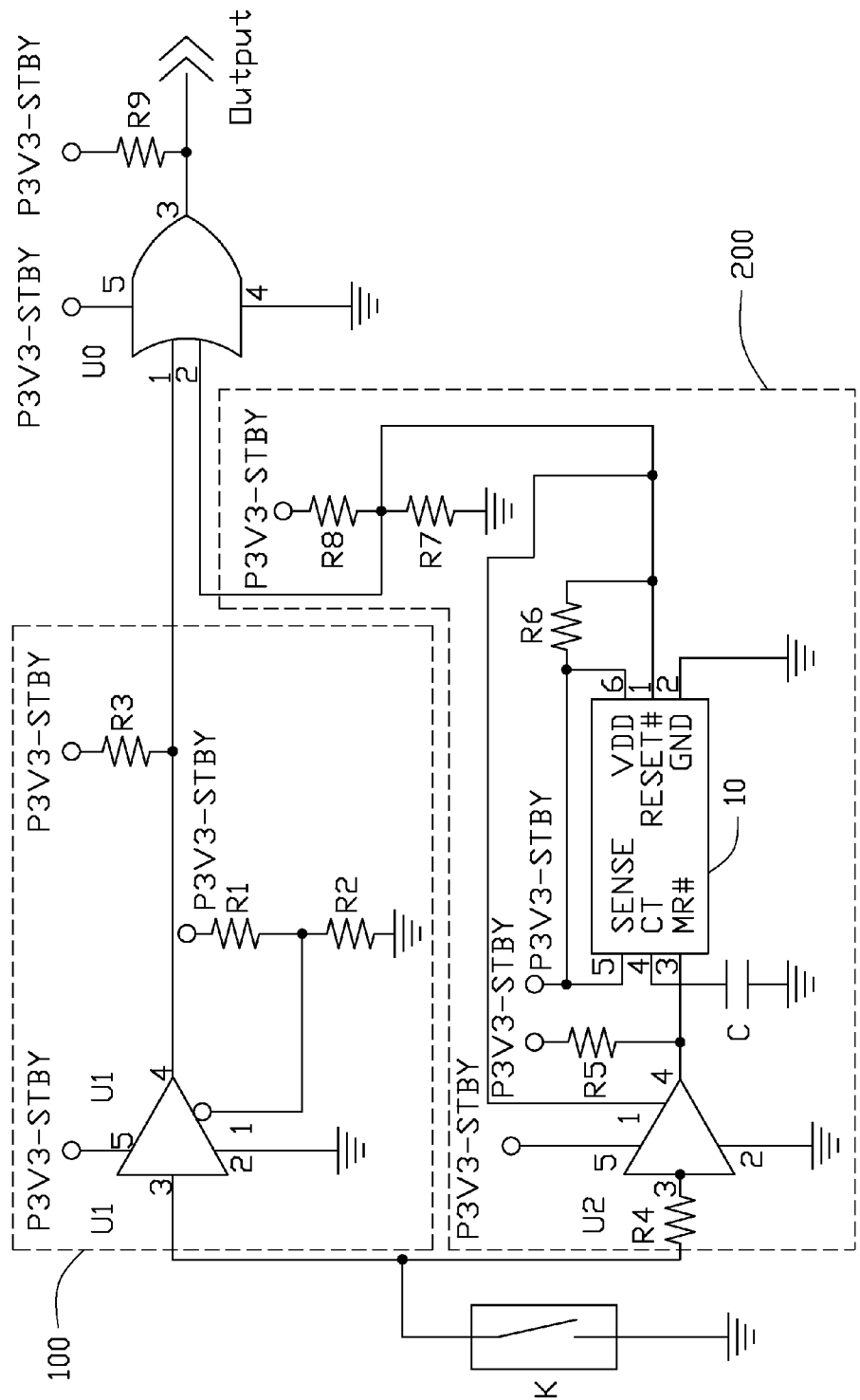
FIG. 2 is a circuit diagram of the control system of FIG. 1.

FIG. 2 illustrates a circuit diagram of the control system of the present disclosure. In at least one embodiment, the comparing circuit 20 can comprise an OR gate U0 and a resistor R9. An output pin 3 of the OR gate U0 is electrically coupled to a power terminal P3V3-STBY through the resistor R9.

The switch circuit 400 can comprise a switch K. A first terminal of the switch K is electrically coupled to ground and a second terminal of the switch K can output the switch signal having the trigger time. In at least one embodiment, the trigger time of the switch signal is equal to the time that the switch K is pushed.

The first buffering circuit 100 can comprise a buffering chip U1 and three resistors R1, R2, and R3. An input pin 3 of the buffering chip U1 can be electrically coupled to the second terminal of the switch K, to receive the switch signal. A ground pin 2 of the buffering chip U1 is electrically coupled to ground. A power pin 5 of the buffering chip U1 can be electrically coupled to the power terminal P3V3-STBY. An enable pin 1 of the buffering chip U1 can be electrically coupled to the power terminal P3V3-STBY through the resistor R1, and can be electrically coupled to ground through the resistor R2. In at least one embodiment, the voltage level of a node between the resistors R1 and R2 is at a low voltage level, to make the voltage level of the enable pin 1 of the buffering chip U1 at the low voltage level. An output pin 4 of the buffering chip U1 can be coupled to a first input pin 1 of the OR gate U0. The output pin 4 of the buffering chip U1 can be coupled to the power terminal P3V3-STBY through the resistor R3. In at least one embodiment, when the voltage level of the enable pin 1 of the buffering chip U1 is at the low voltage level, the output pin 4 of the buffering chip U1 can transmit the voltage level appearing at the input pin 3 of the buffering chip U1.

The second buffering circuit 200 can comprise a buffering chip U2, a delay chip 10, a capacitor C, and five resistors R4-R8. An input pin 3 of the buffering chip U2 can be electrically coupled to the second terminal of the switch K through the resistor R4, to receive the switch signal. A ground pin 2 of the buffering chip U2 can be electrically coupled to ground. An enable pin 1 of the buffering chip U2 can be electrically coupled to a reset pin RESET# of the delay chip 10. An output pin 4 of the buffering chip U2 can be electrically coupled to a reset input pin MR#, and electrically coupled to the power terminal P3V3-STBY through the resistor R5. A signal pin SENSE of the delay chip 10 can be electrically coupled to the power terminal P3V3-STBY. A delay pin CT of the delay chip 10 can be electrically coupled to ground through the capacitor C. A power pin VDD of the delay chip 10 can be electrically coupled to the power terminal P3V3-STBY. The reset pin RESET# of the delay chip 10 can be electrically coupled to the power terminal P3V3-STBY through the resistor R6. A ground pin GND of the delay chip 10 can be electrically coupled to ground. The reset pin RESET# of the delay chip 10 can be electrically coupled to a second input 2 pin of the OR gate U0, and electrically coupled to ground through the resistor R7. The reset pin RESET# of the delay chip 10 can be further electrically coupled to the power terminal P3V3-STBY through the resistor R8. In at least one embodiment, when the voltage level of the enable pin 1 of the buffering chip U2 is at a high voltage level, the voltage level of the output pin 4 of the buffering chip U2 is the same as that of the input pin 3 of the buffering chip U2.

In at least one embodiment, the delay chip 10 can perform a delay operation. For example, when the amount of time that the reset input pin MR# has been at the low voltage level is equal to the predetermined time, the reset pin RESET# of the delay chip 10 can output a low voltage signal. When the amount of time that the reset input pin MR# has been at low voltage level is less than the predetermined time, the reset pin RESET# of the delay chip 10 can output a high voltage signal. When the amount of time that the reset input pin MR# has been at the low voltage level is greater than the predetermined time, the reset pin RESET# of the delay chip 10 can output a low voltage signal. In at least one embodiment, the reset pin RESET# of the delay chip 10 can output a high voltage level signal when the delay chip 10 does not perform a delay operation.

A power pin 5 of the OR gate U0 can be electrically coupled to the power terminal P3V3-STBY. A ground pin 4 of the OR gate U0 can be electrically coupled to ground.

When the switch K is not pushed, the first input pin 1 of the OR gate U0 can receive the first buffering signal with high voltage level, and the reset pin RESET# of the delay chip 10 can output the second buffering signal with high voltage level. Accordingly, the second input pin 2 of the OR gate U0 can receive the second buffering signal with high voltage level and the output pin of the OR gate U0 can output a high voltage level to the motherboard 300.

When the status of the server 500 is changed from power on to power off, and a trigger time of the switch K being pushed is equal to the predetermined time, the first input pin 1 of the OR gate U0 can receive the first buffering signal with low voltage level. If the trigger time is equal to the predetermined time, the reset pin RESET# of the delay chip 10 can output the second buffering signal with low voltage level. Accordingly, the second input pin 2 of the OR gate U0 can receive the second buffering signal with low voltage level and the output pin of the OR gate U0 can output a non-power signal (low voltage level) to the motherboard 300. The motherboard 300 can perform the power off operation when the low voltage non-power signal is received.

When the trigger time of the switch K being pushed is greater than the predetermined time, the first input pin 1 of the OR gate U0 can receive the first buffering signal with low voltage level, the reset pin RESET# of the delay chip 10 can output the second buffering signal with low voltage level. Accordingly, the second input pin 2 of the OR gate U0 can receive the second buffering signal with low voltage level and the output pin of the OR gate U0 can output a non-power signal (low voltage level) to the motherboard 300. The motherboard 300 can perform the power off operation when the low voltage non-power signal is received.

When the trigger time of the switch K being pushed is less than the predetermined time, the first input pin 1 of the OR gate U0 can receive the first buffering signal with low voltage level, the reset pin RESET# of the delay chip 10 can output the second buffering signal with low voltage level. Accordingly, the second input pin 2 of the OR gate U0 can receive the second buffering signal with high voltage level and the output pin of the OR gate U0 can output a high voltage level to the motherboard 300.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A control system, comprising:
   a switch circuit configured to output a switch signal having a trigger time;
   a first buffering circuit electrically coupled to the switch circuit, wherein the first buffering circuit receives the switch signal from the switch circuit, and outputs a first buffering signal according to the switch signal;
   a second buffering circuit electrically coupled to the switch circuit, wherein the second buffering circuit determines whether the trigger time of the switch signal is equal to a predetermined time, the second buffering circuit outputs a second buffering signal with a first status in respond to the trigger time is equal to the predetermined time, the second buffering circuit outputs the second buffering signal with a second status when the trigger time of the switch signal is less than the predetermined time; and
   a comparing circuit electrically coupled to the first and second buffering circuits, wherein the comparing circuit outputs a power signal with a first status, in event that the comparing circuit receives the first buffering signal and the second buffering signal with the first status.

2. The control system of claim 1, wherein the comparing circuit outputs the power signal with the first status to a motherboard, and the motherboard performs a power off operation.

3. The control system of claim 1, wherein the comparing circuit outputs the power signal with a second status in respond to receiving the first buffering signal and the second buffering signal with the second status.

4. The control system of claim 3, wherein the first buffering circuit comprises a first buffering chip, the first buffering chip comprise an enable pin, an input pin, and an output pin, when the enable pin of the first buffering chip is at a low voltage level, the voltage level outputted by the output pin of the first buffering chip is the same as the voltage level of the input pin of the first buffering chip.

5. The control system of claim 4, wherein the second buffering circuit comprises a second buffering chip, the second buffering chip comprise an enable pin, a input pin, and an output pin, when the enable pin of the second buffering chip is at a high voltage level, the voltage level outputted by the output pin of the second buffering chip is the same as the voltage level of the input pin of the second buffering chip.

6. The control system of claim 5, wherein the comparing circuit comprise an OR gate, a first input pin of the OR gate electrically coupled to the first buffering circuit, to receive the first buffering signal; a second input pin of the OR gate electrically coupled to the second buffering circuit, to receive the second buffering signal; an output pin of the OR gate is configured to output the power signal.

7. The control system of claim 6, wherein the switch circuit comprises a switch, a first terminal of the switch is electrically coupled to ground, a second terminal of the switch is configured to output the switch signal.

8. The control system of claim 7, wherein the trigger time of the switch signal has relationship to the time that the switch being pushed.

9. The control system of claim 7, wherein the first buffering circuit further comprise first to third resistors, the input pin of the first buffering pin is electrically coupled to the second terminal of the switch, a ground pin of the first buffering chip is electrically coupled to ground, a power pin of the first buffering chip is electrically coupled to a power terminal, the enable pin of the first buffering chip is electrically coupled to the power terminal through the first resistor, and electrically coupled to ground through the second resistor, the output pin of the first buffering chip is electrically coupled to the first input pin of the OR gate, and is electrically coupled to the power terminal through the third resistor.

10. The control system of claim 9, wherein the second buffering circuit further comprises a delay chip, a capacitor, and fourth to eighth resistors; the input pin of the second buffering chip is electrically coupled to the second terminal of the switch through the fourth resistor, an power pin of the second buffering chip is electrically coupled to the power terminal, a ground pin of the second buffer chip is electrically coupled to ground, the enable pin of the second buffering chip is electrically coupled to a reset pin of the delay chip, the output pin of the second buffering chip is electrically coupled to the reset input pin of the delay chip, the output pin of the second buffering chip is further electrically coupled to the power terminal through the fifth resistor; a signal pin of the delay chip is electrically coupled to the power terminal, an delay pin of the delay chip is electrically coupled to ground through the capacitor, the power pin of the delay chip is electrically coupled to the power terminal, the reset pin of the delay chip is electrically coupled to the power terminal through the sixth resistor, the reset pin of the delay chip is electrically coupled to the second input pin of the OR gate, and electrically coupled to ground through the seventh resistor, the reset pin of the delay chip is electrically coupled to the power terminal through the eighth resistor.

11. The control system of claim 10, wherein the output pin of the OR gate is electrically coupled to the power terminal through a ninth resistor.

12. A control system, comprising:
a switch configured to output a switch signal having a trigger time;
a first buffer circuit electrically coupled to the switch and configured to output a first buffering signal according to the switch signal;
a second buffer circuit electrically coupled to the switch circuit, the second buffering circuit being configured to (a) determine whether the trigger time of the switch signal is equal to a predetermined time, and (b) output a second buffering signal with a first status in response to the trigger time being equal to the predetermined time, the second buffering circuit outputs the second buffering signal with a second status when the trigger time of the switch signal is less than the predetermined time; and
a comparing circuit electrically coupled to the first and second buffering circuits configured to output a power signal with a first status in response to receiving the first buffering signal and the second buffering signal with the first status.

* * * * *